United States Patent
Beckhoff et al.

(10) Patent No.: US 11,758,024 B2
(45) Date of Patent: Sep. 12, 2023

(54) DISTRIBUTOR NODE, AUTOMATION NETWORK AND METHOD FOR TRANSMITTING TELEGRAMS

(71) Applicant: Beckhoff Automation GmbH, Verl (DE)

(72) Inventors: Hans Beckhoff, Verl (DE); Holger Büttner, Berlin (DE); Dirk Janssen, Verl (DE)

(73) Assignee: Beckhoff Automation GmbH, Verl (DE)

( * ) Notice: Subject to any disclaimer, the term of this patent is extended or adjusted under 35 U.S.C. 154(b) by 163 days.

(21) Appl. No.: 17/328,314

(22) Filed: May 24, 2021

(65) Prior Publication Data

US 2021/0281666 A1    Sep. 9, 2021

Related U.S. Application Data (63) Continuation of application No. PCT/EP2019/081190, filed on Nov. 13, 2019.

(30) Foreign Application Priority Data

Nov. 26, 2018    (DE) ..................... 10 2018 129 809.9

(51) Int. Cl.
*H04L 69/166*    (2022.01)
*H04L 45/74*    (2022.01)
*H04L 49/00*    (2022.01)

(52) U.S. Cl.
CPC ............ *H04L 69/166* (2013.01); *H04L 45/74* (2013.01); *H04L 49/30* (2013.01)

(58) Field of Classification Search
CPC ....... H04L 69/166; H04L 45/74; H04L 49/30; H04L 49/3072; H04L 49/9057; H04L 12/40143
See application file for complete search history.

(56) References Cited

U.S. PATENT DOCUMENTS 5,970,062 A * 10/1999 Bauchot ............ H04W 72/1252
370/395.21
6,490,276 B1 * 12/2002 Salett ................... H04Q 3/0029
370/395.2

(Continued)

FOREIGN PATENT DOCUMENTS

CN    101764750 A    6/2010
CN    102572556 A    7/2012

(Continued)

OTHER PUBLICATIONS

"A Distribute-Merge Switch for EtherCAT Networks"; Cena et al.; 2010 IEEE International Workshop on Factory Communication Systems Proceedings; May 18-21, 2010 (Year: 2010).*

(Continued)

*Primary Examiner* — Benjamin H Elliott, IV
(74) *Attorney, Agent, or Firm* — Dorsey & Whitney LLP (57) ABSTRACT

In an automation network comprising a plurality of network segments, fragmenting subscribers that support a fragmentation method as well as standard subscribers that do not support the fragmentation method can be provided for in the network. A distribution node in the automation network has at least one input/output interface that is in communication with a network segment. The switching unit in the distribution node checks whether a subscriber in a network segment to which a telegram is to be sent supports the fragmentation method, and whether the telegram to be sent is fragmented. If the subscriber does not support the fragmentation procedure and the telegram to be sent is fragmented, the switching unit in the distribution node assembles the telegram fragments to form the telegram and then sends the assembled telegram on to the subscriber.

20 Claims, 4 Drawing Sheets

(56) References Cited

U.S. PATENT DOCUMENTS

| | | | | |
|---|---|---|---|---|
| 7,215,637 | B1* | 5/2007 | Ferguson | H04L 45/745 370/230.1 |
| 7,551,173 | B2* | 6/2009 | Cao | G06T 11/40 382/199 |
| 7,688,727 | B1* | 3/2010 | Ferguson | H04L 67/1001 370/230.1 |
| 7,714,865 | B2* | 5/2010 | Faggion | G06T 11/40 345/441 |
| 7,936,818 | B2* | 5/2011 | Jayant | H04N 19/103 382/235 |
| 8,107,485 | B2* | 1/2012 | Weber | H04L 12/4625 709/208 |
| 9,584,337 | B2* | 2/2017 | Kadel | H04L 12/2863 |
| 10,778,754 | B2* | 9/2020 | Capello | H04L 67/51 |
| 11,233,768 | B1* | 1/2022 | Flack | H04L 41/0823 |
| 11,234,059 | B1* | 1/2022 | Ram | H04N 21/2393 |
| 2004/0246988 | A1* | 12/2004 | Bruckner | H04L 67/564 370/465 |
| 2007/0058682 | A1* | 3/2007 | Albrecht | H04J 3/0641 370/503 |
| 2007/0171928 | A1* | 7/2007 | Kim | H04L 47/12 370/535 |
| 2008/0117936 | A1* | 5/2008 | Steindl | H04L 69/28 370/498 |
| 2010/0067540 | A1* | 3/2010 | Park | H04L 49/3072 370/419 |
| 2012/0002680 | A1* | 1/2012 | Naouri | H04L 47/245 370/428 |
| 2012/0044918 | A1* | 2/2012 | Ardhanari | H04L 47/2441 370/389 |
| 2012/0144420 | A1* | 6/2012 | Del Sordo | H04N 21/44016 725/35 |
| 2013/0003754 | A1* | 1/2013 | Blumenroether | G08C 19/00 370/431 |
| 2013/0016724 | A1* | 1/2013 | Thaler | H04L 47/245 370/393 |
| 2013/0191501 | A1* | 7/2013 | Jebenstreit | H04L 12/413 709/217 |
| 2014/0245114 | A1* | 8/2014 | Thaler | H04L 1/0061 370/389 |
| 2015/0023147 | A1* | 1/2015 | Lee | H04L 45/38 370/216 |
| 2015/0117177 | A1* | 4/2015 | Ganga | H04L 49/251 370/216 |
| 2017/0331748 | A1* | 11/2017 | Mangin | H04L 47/826 |
| 2018/0007007 | A1* | 1/2018 | Bansal | H04L 63/0263 |
| 2018/0092085 | A1* | 3/2018 | Shaheen | H04W 36/0022 |
| 2019/0363906 | A1* | 11/2019 | Bunte | H04L 12/4035 |
| 2020/0014778 | A1* | 1/2020 | Mangin | H04L 47/50 |
| 2020/0136953 | A1* | 4/2020 | Datta | H04L 47/245 |
| 2020/0314960 | A1* | 10/2020 | Basu Mallick | H04W 72/14 |
| 2021/0203720 | A1* | 7/2021 | Beckhoff | H04L 12/40163 |
| 2021/0218584 | A1* | 7/2021 | Janssen | H04L 12/12 |
| 2021/0281666 | A1* | 9/2021 | Beckhoff | H04L 49/9057 |
| 2021/0314238 | A1* | 10/2021 | Cioffi | H04L 43/55 |
| 2021/0352682 | A1* | 11/2021 | Zheng | H04W 72/1231 |
| 2022/0236712 | A1* | 7/2022 | Büttner | H04L 12/437 |

FOREIGN PATENT DOCUMENTS

| | | | | |
|---|---|---|---|---|
| CN | 104704776 | A | 6/2015 | |
| CN | 107567706 | A | 1/2018 | |
| DE | 112012005111 | T5 | 10/2014 | |
| DE | 102018129809 | A1 | 5/2020 | |
| WO | 2008092805 | A2 | 8/2008 | |
| WO | 2009089850 | A1 | 7/2009 | |
| WO | WO-2016026783 | A1 * | 2/2016 | ....... H04L 12/40006 |
| WO | 2020108998 | A1 | 6/2020 | |

OTHER PUBLICATIONS

"Real-Time Ethernet the Ethernet solution"; Jansen et al.; IEE Computing & Control Engineering; Feb./Mar. 2004 (Year: 2004).*

"IEEE Standard for Ethernet Amendment 5: Specification and Management Parameters for Interspersing Express Traffic"; IEEE Std 802.3br; 2016 (Year: 2016).*

International Search Report (ISR), English Translation PCT/EP2019/081190; dated Dec. 1, 2020 (Year: 2020).*

Office Action dated Mar. 2, 2022 in connection with Chinese patent application No. 201980077632.9, 10 pages including English translation.

International Search Report and Written Opinion dated Jan. 2, 2020 in connection with International Patent Application No. PCT/EP2019/081190, 24 pages including English translation.

Examination Report dated Oct. 7, 2019 in connection with German patent application No. DE 10 2018 129 809.9, 16 pages including English translation.

International Preliminary Report on Patentability dated Jun. 11, 2020 in connection with International Patent Application No. PCT/EP2019/081190, 38 pages including English translation.

"IEEE Standard for Ethernet: Amendment 5: Specification and Management Parameters for Interspersing Express Traffic," Jun. 30, 2016, 58 pages.

"EtherCAT—the Ethernet Fieldbus," EtherCAT Technology Group, Nov. 2012, 21 pages.

* cited by examiner

DISTRIBUTOR NODE, AUTOMATION NETWORK AND METHOD FOR TRANSMITTING TELEGRAMS

CROSS-REFERENCE TO RELATED APPLICATIONS

This application is a continuation of International Patent Application PCT/EP2019/081190, filed 13 Nov. 2019, "Distributor Node, Automation Network and Method for Transmitting Telegrams," which claims the priority of German patent application DE 10 2018 129 809.9, filed 26 Nov. 2018, "Verteilerknoten, Automatisierungsnetzwerk and Verfahren zum Ubertragen von Telegrammen," each of which is incorporated by reference herein, in the entirety and for all purposes.

FIELD

The present invention relates to a distribution node, an automation network comprising a distribution node and a method for transmitting telegrams in an automation network comprising network segments.

BACKGROUND

Local communication networks, referred to as "local area networks" (LANs), are limited to a geographical area and consist of one or more servers and worksubscribers, referred to as nodes, which are interconnected via a communication line network, e.g. a coaxial, fiber optic or twisted pair cable. LANs are operated by a network operating system and a network protocol.

The currently most widespread standard for a LAN network protocol is Ethernet, which can be used to transmit telegrams, also referred to as Ethernet telegrams in the following, with data up to a length of 1500 bytes at a speed in the gigabit range. The Ethernet protocol was first used in office communication networks. Due to the advantages of the Ethernet concept, which result from the use of standard hardware and software components and the possibility of achieving high data transmission rates even with simple networking technology, Ethernet network communication has also become established in industrial manufacturing for exchanging data and for performing control tasks.

When using LANs in industrial manufacturing, the real-time capability of the network protocol must be guaranteed in particular. When controlling machines, it is necessary that cyclic processing of the control task is carried out without temporal fluctuations, i.e. with only minor deviations from the desired cycle time in the range of a few microseconds, with a predictable response time to the control request.

In order to limit the throughput time of telegrams from the transmitting node to the receiving node in LANs with many nodes, also referred to as subscribers in the following, and thus to be able to achieve real-time capability, LANs used in automation technology are often structured hierarchically using distribution nodes, so-called switches. The distribution node has several input/output interfaces via which several subscribers or subscriber strings are integrated into the network in parallel. The distribution node checks each telegram received on an input/output interface for the address of the addressed subscriber and then forwards the telegram to the addressed subscriber via the assigned input/output interface to which the subscriber is connected.

The distribution nodes usually operate according to the FIFO principle, in which those telegrams that were received first are also transmitted first. However, this may prevent reliable real-time processing of the telegrams. More up-to-date distribution nodes thus frequently support what is referred to as VLAN tagging, which may be used to prioritize individual telegrams during transmission in order to ensure real-time capability.

For example, a prioritization procedure is described in IEEE Std 802.3br for Ethernet, Amendment 5: Specification and Management Parameters for Interspersing Express Traffic, 2016, which differentiates between an "Express Traffic" priority level and a "Preemptable Traffic" priority level. The distribution node interrupts the transmission process on an input/output interface for a telegram assigned the priority level "Preemptable Traffic" for a telegram assigned the priority level "Express Traffic". The remaining part of the interrupted telegram of the priority level "Preemptable Traffic", which has not yet been sent by the distribution node, is buffered in the distribution node and transmitted later as a further telegram fragment. For such a prioritization procedure, it is necessary that all nodes in the network are able to reassemble the fragmented telegrams of the priority level "Preemptable Traffic".

SUMMARY

The present invention provides an improved distribution node, an improved automation network and an improved data transmission method.

According to one aspect, a distribution node is provide for an automation network having a plurality of network segments which each have at least one subscriber which may be embodied as fragmenting subscribers or as standard subscribers, wherein data are exchanged between the subscribers in the form of telegrams, wherein the transmission of the telegrams may be carried out in accordance with a fragmentation method in the form of telegram fragments and wherein both the fragmenting subscribers which support the fragmentation method and the standard subscribers which do not support the fragmentation method may be provided in the automation network. The distribution node comprises a plurality of input/output interfaces and a switching unit connected to the input/output interfaces, wherein at least one input/output interface is in communication with a network segment, wherein the switching is embodied to check whether a subscriber at the input/output interface to which a telegram is to be sent supports the fragmentation method and whether the telegram to be sent is fragmented, and wherein the switching unit is embodied, if the telegram to be sent is fragmented, to assemble the telegram fragments into the telegram and then to send it to the subscriber if the subscriber is a standard subscriber that does not support the fragmentation method.

According to another aspect, an automation network comprises network segments which each have at least one subscriber, which may be embodied as a fragmenting subscriber or as a standard subscriber, and at least one distribution node which has a plurality of input/output interfaces and a switching unit which is connected to the input/output interfaces, at least one input/output interface being connected to a network segment, data being exchanged between the subscribers in the form of telegrams, it being possible for the telegrams to be transmitted in accordance with a fragmentation method in the form of telegram fragments, and both the fragmenting subscribers may be provided which support the fragmentation method and the standard subscribers may be provided which do not support the fragmentation method. The switching unit in the distribution node is embodied to check whether a subscriber at the input/output interface to which a telegram is to be transmitted supports the fragmentation method, and whether the telegram to be sent is fragmented, and wherein the switching unit in the distribution node is embodied, if the telegram to be sent is fragmented, to assemble the telegram fragments into the telegram and then to send it to the standard subscriber which does not support the fragmentation method.

According to another aspect, a method transmits telegrams in an automation network comprising network segments which each have at least one subscriber which may be embodied as a fragmenting subscriber or as a standard subscriber, and having at least one distribution node which has a plurality of input/output interfaces and a switching unit which is connected to the input/output interfaces, wherein at least one input/output interface is connected to a network segment, wherein data is exchanged between the subscribers in the form of telegrams, wherein the transmission of the telegrams may be carried out according to a fragmentation method in the form of telegram fragments and wherein both fragmenting subscribers that support the fragmentation method and standard subscribers that do not support the fragmentation method may be provided, wherein the switching unit in the distribution node checks whether a subscriber has an input/output interface to which a telegram is to be sent supports the fragmentation method, and whether the telegram to be sent is fragmented, and whether the telegram to be sent is fragmented, assembling the telegram fragments to form the telegram and then sending it to the standard subscriber which does not support the fragmentation method.

EXAMPLES

To ensure mixed operation in the automation network with network segments that have subscribers and distribution nodes that connect the network segments, fragmented transmission of telegrams is possible without all subscribers having to support the fragmentation procedure.

In an automation network having a plurality of network segments, each comprising at least one subscriber, data is exchanged between the subscribers in the form of telegrams, wherein the transmission of the telegrams may be carried out in accordance with a fragmentation method in the form of telegram fragments, and wherein both subscribers which support the fragmentation method and standard subscribers which do not support the fragmentation method may be provided. A distribution node in the automation network comprises a plurality of input/output interfaces and a switching unit connected to the input/output interfaces, wherein at least one input/output interface is in communication with a network segment. The switching unit in the distribution node checks whether a subscriber at the input/output interface to which a telegram is to be sent supports the fragmentation method, and whether the telegram to be sent is fragmented. If the subscriber is a standard subscriber that does not support the fragmentation procedure and the telegram to be sent is fragmented, the switching unit in the distribution node assembles the telegram fragments to form the telegram and then sends the assembled telegram on to the standard subscriber.

The procedure described above makes it possible to carry out telegram fragmentation in an automation network even if not all nodes in the automation network support the fragmentation procedure. In this way, the automation network may perform fast telegram transmission in compliance with a real-time requirement even in the case of a non-uniform structure in which the nodes are configured differently. The automation networks may be expanded easily and flexibly.

In the distribution node, an allocation table may be provided that contains identifiers of the standard subscribers that do not support the fragmentation method, wherein the switching unit is embodied to detect an identifier of the addressed subscriber when a telegram is received and to compare it with the identifiers of the subscribers in the allocation table. In this embodiment, the information that the standard subscriber does not support the fragmentation method may be processed in a simple manner within the framework of the passing-through process in the distribution node.

Alternatively, the allocation table may also be embodied in such a way that the information is assigned to the input/output interface having the network segment as to whether fragmented transmission is allowed via the input/output interface having the network segment or not. In this case, the allocation table is independent of an identifier in the telegram and no additional comparison is required. It is then not necessary, either, to store for each telegram identifier whether the addressed subscriber supports the fragmentation procedure; it is sufficient to do this once for the input/output interface.

Furthermore, in the distribution node the switching unit may create the allocation table when the automation network is started up. This enables reliable assignment of subscriber capabilities with regard to telegram fragmentation.

In this case, the switching equipment in the distribution node may independently perform a checking process with the subscribers in network segments connected to the input/output interfaces to determine the identifiers of the standard subscribers that do not support the fragmentation procedure.

Furthermore, the distribution node may always receive telegrams intended for a standard subscriber that does not support the fragmentation procedure in full before starting transmission to the subscriber.

The switching unit in the distribution node aborts a transmission process if the telegram is intended for a standard subscriber that does not support the fragmentation procedure and if the telegram is fragmented, wherein the standard subscriber discards the telegram fragment that has already been transmitted.

The switching unit in the distribution node may be embodied to not apply the fragmentation procedure to the telegram, if a telegram is to be sent to a standard subscriber in a network segment connected to an input/output interface that does not support the fragmentation procedure.

The advantageous embodiments and further embodiments explained above and/or indicated in the dependent claims may—except for example in cases of clear dependencies or incompatible alternatives—be applied individually or also in any combination with one another.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In industrial automation, automation networks are used to connect distributed devices of an actuator/sensor level with a control level. The automation networks, also referred to as field-bus systems, usually have a serial bus to which all network nodes are connected.

The Ethernet standard has established itself as the communication standard for networks. In the Ethernet concept, the data is encapsulated with a header section, also referred to as header in the following, and an end section, also referred to as trailer in the following, for transport from subscriber to subscriber. Ethernet telegrams have a data length of up to 1500 bytes and can be transmitted at speeds up to the gigabit range. In field-bus systems, real-time capable Ethernet protocols such as EtherCAT are preferably used. However, in addition to the Ethernet standard, other protocol types such as the CANopen protocol may also be used in field-bus systems.

The field-bus systems are often operated as master-slave bus systems. The master subscribers in the field-bus system are the control nodes that regulate the data traffic on the serial bus. Such master subscribers are e.g. industrial PCs that serve as process control computers in production lines. The master subscribers have bus access authorization and may output data on the serial bus. The slave subscribers in the field-bus system are formed by the machine peripherals, such as I/O devices, valves, drives, sensors, transducers. As a rule, they do not have their own bus access authorization, i.e. they may only acknowledge received data and transmit data via the bus upon request.

In industrial automation, control is usually performed by data exchange via the field-bus systems in such a way that the master subscriber cyclically executes control processes in order to generate output data for slave subscribers and/or other slave subscribers on the basis of input data. After completing a control process cycle, the master subscriber then sends the output data in the form of telegrams on the field bus, wherein the slave subscribers take the output data assigned to the respective slave subscriber from the telegrams and use this output data to execute a local subscriber process. The data determined by the local subscriber process is then in turn sent back by the slave subscriber to the master subscriber and then used as input data for the next control process cycle by the master subscriber.

In order to be able to perform fast control processes using field-bus systems, a short cycle time of the telegrams must be guaranteed so that real-time execution of the control process is achieved. In field-bus systems with many subscribers, branches are often used to shorten the runtime of the telegrams from the transmitting to the receiving subscriber. The field-bus system then has distribution nodes, in the following also referred to as switches, in the data transmission path, to which several independent network segments are respectively connected.

The distribution nodes usually operate according to the FIFO principle, in which those telegrams that were received first are also sent again first. However, this transmission principle of the distribution nodes can jeopardize reliable real-time execution of control processes. In field-bus systems, in addition to telegrams that are used to execute control tasks and the data traffic of which is cyclic, other telegrams are exchanged in acyclic data traffic, as well. The acyclic data traffic is thereby used for events in the field-bus system that are not constantly repeated. Acyclic telegrams are, for example, telegrams with parameter and status data. In contrast to cyclic telegrams, these acyclic telegrams are not real-time relevant. The FIFO principle in the distribution node can then lead to the transmission of an acyclic telegram blocking the forwarding of a cyclic telegram received later, thus delaying the processing of the cyclic telegram that is required to perform a control task.

Distribution nodes therefore often support what is referred to as VLAN tagging, which may be used to prioritize individual telegrams during transmission in order to ensure real-time capability. For this purpose, priorities are assigned to the telegrams to be transmitted in the automation network. This means that cyclic real-time telegrams that are relevant for controlling the automation network and contain cyclic input/output data of the subscribers may then have an first higher priority value. The acyclic non-real-time telegrams described, which contain parameter or status data of the subscribers, are then assigned a second lower priority value.

The distribution nodes are then embodied in such a way that the distribution node interrupts the sending of a telegram with the second, lower priority value on an input/output interface if the distribution node receives a telegram with the first, higher priority value. In doing so, the distribution node terminates the already sent telegram fragment in a defined way by sending a fragmenting information indicating that it is a telegram fragment at the end of the telegram fragment. The remaining telegram fragment continues to be buffered by the distribution node. After sending the telegram with the first, higher priority value on the input/output interface, the distribution node then sends the buffered telegram part with the second, lower priority value together with further fragmentation information on the input/output interface. The subscriber for which the telegram with the second, lower priority value is intended then reassembles the first and second telegram fragments after receipt on the basis of the fragmenting information sent along.

To enable the subscriber to reassemble the telegram fragments, it must be ensured that the subscriber supports the fragmentation procedure applied to the telegrams. In order to enable the use of a fragmentation method in an automation network in which subscribers may also be provided in the network that do not support the fragmentation method used, the distribution nodes in the automation network are embodied to control the fragmentation method depending on whether the fragmentation method used in the automation network is implemented in a subscriber located in a network segment connected to an input/output interface of the distribution node.

If the distribution node detects that the subscriber addressed in a telegram does not support the fragmentation procedure and the telegram to be forwarded to this subscriber is fragmented, the distribution node reassembles the telegram fragments of the fragmented telegram and then forwards the assembled telegram to the addressed subscriber instead of the telegram fragments. This procedure ensures that the subscriber in the automation network that does not support the implemented fragmentation procedure does not receive a fragmented telegram for processing, but always a complete telegram. Thus, the automation network allows for a mixed operation with subscribers that support the fragmentation procedure and subscribers that do not support the fragmentation procedure.

In the distribution node, an allocation table may be provided that contains identifiers of the standard subscribers that do not support the fragmentation method, wherein the switching unit is embodied to detect an identifier of the addressed subscriber when a telegram is received and to compare it with the identifiers of the subscribers in the allocation table. In this embodiment, the information that the standard subscriber does not support the fragmentation method may be processed in a simple manner as part of the passing-through process in the distribution node.

Alternatively, the allocation table may also be embodied in such a way that the information is assigned to the input/output interface with the network segment as to whether fragmented transmission is allowed via the input/output interface with the network segment or not. In this case, the allocation table is independent of an identifier in the telegram and no additional comparison is required. It is then not necessary, either, to store for each telegram identifier whether the addressed subscriber supports the fragmentation procedure, but it is sufficient to do this only once for the input/output interface.

Figure 1:
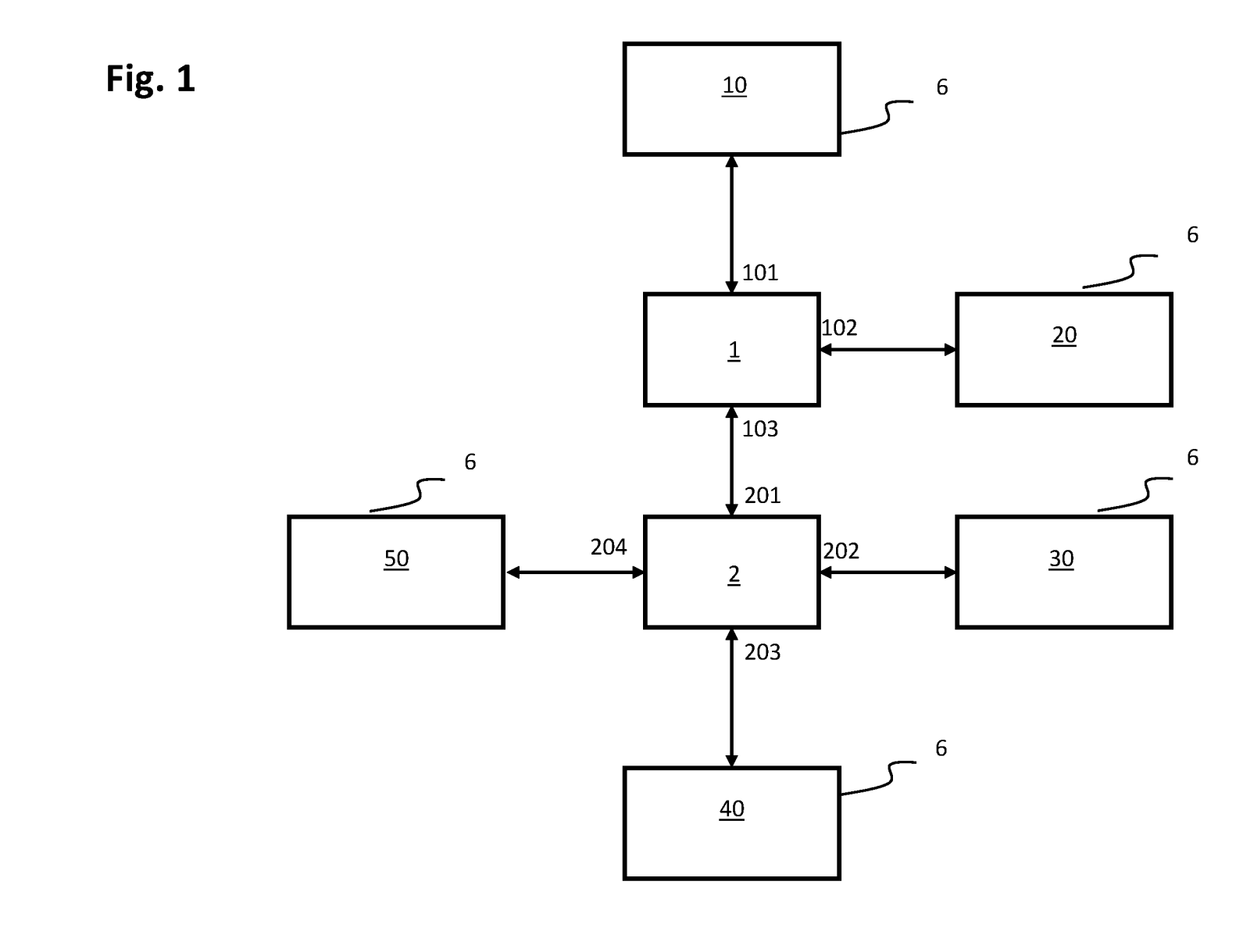
FIG. 1 schematically shows a structure of an automation communication network comprising several distribution nodes and network segments.

FIG. 1 shows a schematic diagram of a field-bus system in which both subscribers 6 that support the fragmentation method, also referred to below as fragmentation nodes 10, 20, 30, 40, and subscribers 6 that do not support the fragmentation method, also referred to below as standard nodes 50 are provided. The topology of the automation network shown in FIG. 1 comprises two distribution nodes 1, 2, to which a total of five subscribers 6 are connected, namely four fragmentation subscribers 10, 20, 30, 40 and one standard subscriber 50.

The first distribution node 1 has three further input/output interfaces 101, 102, 103, the first fragmenting subscriber 10 being connected to the further first input/output interface 101, the second fragmenting subscriber 20 being connected to the further second input/output interface 102, and the distribution node 2 being connected to the further third input/output interface 103. The second distribution node 2 comprises four input/output interfaces 201, 202, 203, 204, of which the first input/output interface 201 is connected to the further third input/output interface 103 of the first distribution node 1. The third fragmenting subscriber 30 is connected to the second input/output interface 202 of the second distribution node 2, and the fourth fragmenting subscriber 40 is connected to the third input/output interface 203 of the second distribution node 2. The fourth input/output interface 204 of the second distribution node 2 is connected to the standard subscriber 50.

The embodiment of the automation network shown in FIG. 1 is only an example. In principle, it is possible to interconnect any number of switches. Also, each switch may have any number of input/output interfaces. Furthermore, in each network segment connected to an input/output interface of a switch, any number of subscribers may be arranged within a network segment, which may be fragmenting subscribers as well as standard subscribers. In particular, a mix of fragmenting subscribers and standard subscribers may be interconnected in each network segment.

Figure 2:
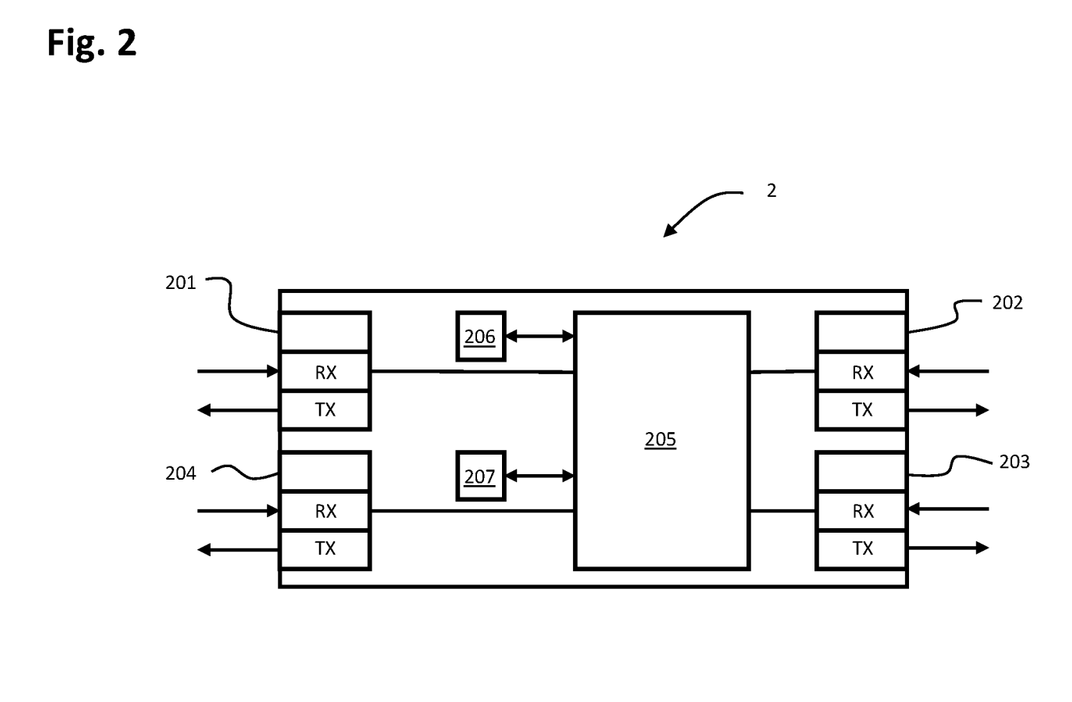
FIG. 2 shows a schematic diagram of a distribution node of FIG. 1.

FIG. 2 shows a schematic diagram of the structure of the second distribution node 2 as an example of the distribution nodes used in the automation network. The first distribution node 1 in FIG. 1 has an analogous structure. The four first to fourth input/output interfaces 201, 202, 203, 204 are connected to a switching unit 205 which controls the operation of the second distribution node 2. Each of the four first to fourth input/output interfaces 201, 202, 203, 204 has a receiving unit RX and a transmitting unit TX, with arrows in FIG. 2 indicating the respective data transmission direction.

For controlling the telegram traffic by the second distribution node 2, the switching unit 205 is connected to an allocation table 206, in the following referred to as routing list, and a memory unit 207. For each telegram 3 used in the automation network, the allocation table 206 contains at least one telegram identifier and the transmitting unit TX of an assigned first to fourth input/output interface 201, 202, 203, 204. Furthermore, depending on the network protocol used, the allocation table 206 may comprise further information on the individual telegrams 3, such as the time of transmission, the receiving unit RX of a first to fourth input/output interface 201, 202, 203, 204 and the time of receipt.

When a telegram 3 is received via the receiving unit RX of a first to fourth input/output interface 201, 202, 203, 204, the switching unit 205 in the second distribution node 2 detects the telegram identifier in the received telegram 3 and compares the detected telegram identifier with the entries in the allocation table 206. The switching unit 205 then outputs the telegram 3 according to the specification in the allocation table 206 via the transmitting unit TX of the assigned first to fourth input/output interfaces 201, 202, 203, 204 noted for the telegram identifier in the allocation table 206.

The telegram traffic in the automation network shown in FIG. 1 is described below as an example using telegrams 3, which may generally also be referred to as Ethernet telegrams. However, it is possible to use any other network protocols.

Figure 3:
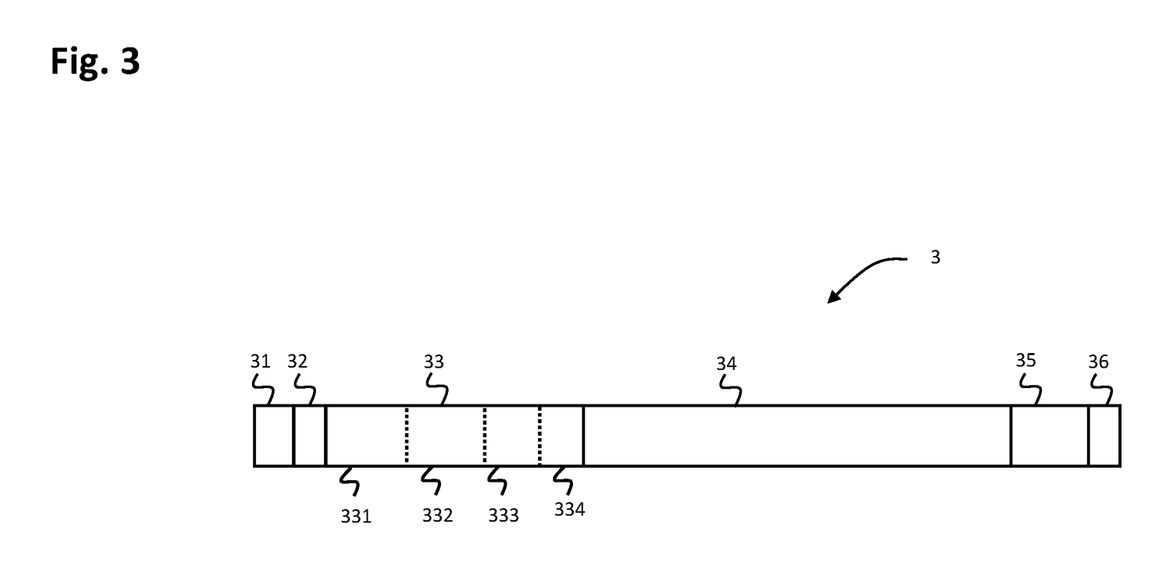
FIG. 3 shows a schematic diagram of the basic structure of an Ethernet telegram with priority information.

FIG. 3 schematically shows the structure of a telegram 3 in the form of an Ethernet telegram with a VLAN tag extension that may be used to prioritize the telegram 3 during transmission. The telegram 3 comprises a data area 34 with a length of up to 1500 bytes, which is encapsulated by a header section, which may generally also be referred to as header 33, and an end section, the so-called trailer 35. The header 33 is preceded by a 7 byte long preamble 31, which is used for synchronization, and a 1 byte long start identifier 32 for the actual telegram 3, a so-called start of frame delimiter, SOF. The header 33 comprises 18 bytes and is made up of a 6-byte target address field 331, a 6-byte sender address field 332, a 4-byte VLAN tag field 333 and a 2-byte type field 334. In the VLAN tag field 333 the priority value of telegram 3 is encoded. The type field 334 indicates the telegram type, i.e. the protocol of the next higher processing layer. The trailer 35 at the end of the telegram 3 is 4 bytes long. Trailer 35 comprises a checksum. The calculation of the checksum, which is executed by the sending subscriber 6, starts with the target address field 331 and ends with the data area 34. The preamble 31, the start identifier 32 as well as the trailer 35 itself are not included in the checksum. On the basis of the checksum, the subscriber 6 acting as receiver and repeating the calculation may then determine whether the transmission was faulty by comparing the two values. A control symbol 36, a so-called End of Frame EOF, is added to the end of frame 3 to indicate that frame 3 has been completed.

As an alternative to the VLAN tag field 333 which contains the priority value of the telegram 3 the priority value may, however, also be displayed at another position in the header 33 and e.g. be encoded in the target address field 331 or in the sender address field 332.

In the following, a telegram traffic in the automation network shown in FIG. 1 is described, in which the prioritized telegram 3 shown in FIG. 3 is used, to which a fragmentation procedure may be applied. The following two scenarios are contrasted. The first fragmenting subscriber 10 sends a first telegram 3 with priority value 1 at a first point in time. A second telegram 3 with the priority value 2 is sent by the second fragmenting subscriber 20 at a point in time. It is assumed that the second point in time is after the first point in time and the priority value 2 indicates a higher priority than the priority value 1. In the first scenario, the two telegrams 3 are intended for the fourth fragmenting subscriber 40, which supports the fragmentation procedure. In the second scenario, on the other hand, the two telegrams 3 are addressed to the standard subscriber 50, which does not support the fragmentation procedure.

At the first point in time, the first distribution node 1 receives the first telegram 3 with the priority value 1 on the further first input/output interface 101. Based on the telegram identifier, in the first telegram 3 the target address, the first distribution node 1 searches for the corresponding entry in its allocation table and then processes the telegram 3 accordingly. The allocation table then indicates in the first distribution node 1, both in the first scenario in which the fourth fragmenting subscriber 40 is addressed and in the second scenario in which the standard subscriber 50 is addressed, that the first telegram 3 is to be forwarded on the further third input/output interface 103 to which the distribution node 2 is connected.

The first distribution node 1 then starts the corresponding transmission of the first telegram 3 on the further third input/output interface 103. At point in time T2, the first distribution node 1 then receives the second Ethernet telegram 3 on the further second input/output interface 102 and again evaluates the target address field. As in the case of the first telegram 3, the allocation table indicates to the second distribution node 1 that the second telegram 3 is to be forwarded to the distribution node 2 on the further third input/output interface 103.

However, the further third input/output interface 103 of the first distribution node 1 is at the second point in time already blocked by the transmission of the first telegram 3. Due to the higher priority of the second telegram 3 compared to the first telegram 3, which the first distribution node 1 determines when evaluating the two VLAN tag fields in the first and second telegram 3, the first distribution node 1 aborts the transmission process of the first Ethernet telegram 3.

During the abort process, the first distribution node 1 thereby uses the fragmentation procedure implemented in the automation network. At the end of the aborted first telegram 3, the first distribution node 1 sends fragmentation information comprising a fragmentation identifier and a checksum, and a first control symbol 36 indicating the end of a fragment. The fragmenting identifier may e.g. be a fragment number identifying the already transmitted portion of the first telegram 3 as the first telegram fragment 301. The checksum is calculated by the first distribution node 10 from the already sent telegram fragment.

Furthermore, the first distribution node 10 stores the remaining fragment of the first telegram 3 in its memory unit 207. The stored second fragment of the first telegram 3 is thereby additionally provided with a header 33, which in turn comprises a fragment identifier that refers to the first fragment of the first telegram 3 and may e.g. be the fragment number of the first fragment. The header 33 is additionally preceded by a second control symbol 321 which indicates the start of a fragment.

The first distribution node 1, after canceling the first telegram 3, then starts transmitting the second telegram 3 with the higher priority value 2 via the further third input/output interface 103. After the second telegram 3 has been forwarded, the first distribution node 1 sends the stored second fragment of the first telegram 3 with the lower priority value 1, wherein the second control symbol 321 and the header 33 with the fragment identifier are sent, as well. In addition, a checksum calculated by the first distribution node 1 on the basis of the data of the second fragment is then again appended at the end of the second telegram fragment in the trailer 35 and the end of the frame control symbol 36 for the first telegram 3 is transmitted at the end.

In principle, it is also possible that the transmission of this second fragment and to fragment the second fragment is again interrupted if, when sending the second fragment, a further telegram 3 with a higher priority, e.g. priority value 2, is received by the first distribution node 1 on a further first to third input/output interface 101, 102, 103 and is to be forwarded via the further third input/output interface 103. In case of such a further fragmentation, the procedure is then analogous to the first fragmentation.

Figure 4:
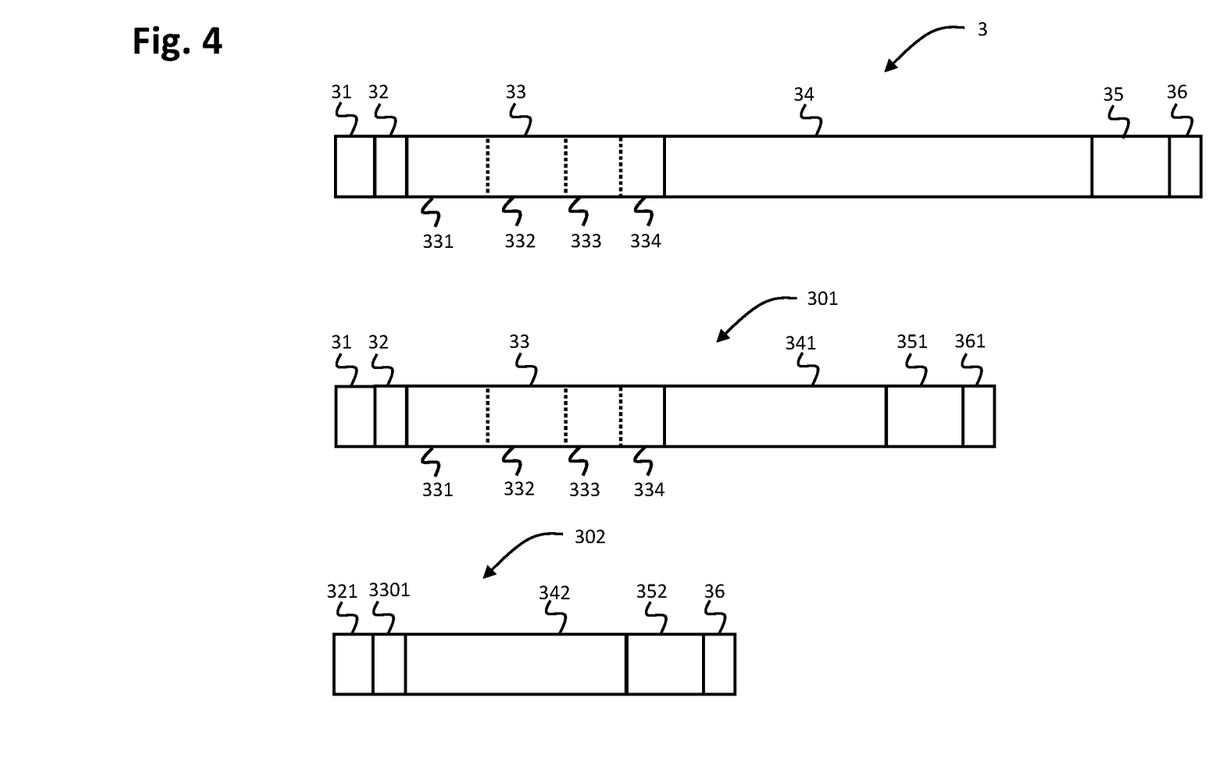
FIG. 4 shows a schematic diagram of a telegram according to FIG. 3 exchanged between nodes in the automation network according to FIG. 1, before and after fragmentation, divided into two fragments.

FIG. 4 shows the first Ethernet telegram 3 in its original form and after fragmentation into the first telegram fragment 301 and the second telegram fragment 302. Compared to the original telegram 3, which is structured according to the telegram 3 shown in FIG. 3, the first telegram fragment 301 has the modified trailer 351, which contains the fragment information and the fragment checksum, and the first fragment control symbol 361 in a shortened user data area 341. The second telegram fragment 302 starts with the second fragment control symbol 321 and the modified header 3301 containing the fragment identifier. This is then followed by the remaining user data area 342, the additional trailer 352 containing the fragment checksum, and the end of frame control symbol 36 indicating the end of the telegram.

Instead of the explained fragmentation procedure, it is also possible to process telegrams 3 provided with priorities using other fragmentation procedures. In principle, this requires that fragmentation information be assigned to the individual telegram fragments 301, 302 during fragmentation, which then enables the telegram fragments 301, 302 to be reassembled into a complete telegram 3. In this case, the first telegram fragment 301 must be uniquely identified by fragmentation information. The second telegram fragment 302 and the following telegram fragments must then each comprise fragmenting information that enables allocation to the first telegram fragment and the preceding telegram fragment, respectively. As explained above, this can be carried out by a consecutive fragment number by which a preceding telegram fragment refers to a subsequent telegram fragment.

In order for the addressed subscriber to reassemble the telegram fragments 301, 302 into telegram 3, it is necessary that the addressed subscriber supports the fragmentation procedure. In the first scenario, in which the fourth fragmenting subscriber 40 is addressed in the first telegram 3 fragmented by the first distribution node 1, the fourth fragmenting subscriber 40 has this functionality and can process the two telegram fragments 301, 302. Therefore, after receiving the telegram fragments 301, 302 via the first input/output interface 201, the second distribution node 2 then forwards the telegram fragments 301, 302 on this third input/output interface 203 after evaluating the telegram identifier on the basis of the allocation table 206, which indicates to the second distribution node 2 that the addressed fourth fragmenting subscriber 40 is connected to the third input/output interface 203. After receiving the two telegram fragments 301, 302, the fourth fragmenting subscriber 40 assembles the two telegram fragments 301, 302 into the first telegram 3 by with the fragmenting information contained in the telegram fragments 301, 302.

In the second scenario, on the other hand, when the first telegram 3 is addressed to the standard subscriber 50 which does not support the fragmentation procedure, the switching unit 205 in the second distribution node 2 first assembles the two telegram fragments 301, 302 and then sends the assembled first telegram 3 on to the standard subscriber 50, which may now process the first telegram 3.

The second distribution node 2 proceeds in such a way that the switching unit 205, when evaluating the telegram identifier for determining the assigned transmission information in the allocation table 206, i.e. in particular the assigned second to fourth input/output interfaces 202, 203, 204 via which the telegram 3 is to be forwarded, additionally checks whether the addressed subscriber 6, if the addressed subscriber 6 is directly connected to the corresponding second to fourth input/output interfaces 202, 203, 204 via a network segment, supports the fragmentation method used in the automation network. For this purpose, the allocation table 206 further contains, in addition to the transmission information, a corresponding subscriber identifier indicating whether or not the addressed subscriber 6 supports the fragmentation method. The subscriber identifier may e.g. be indicated by a Boolean value.

Alternatively, the allocation table 206 may also be embodied in such a way that the fourth input/output interface 204, to which the standard subscriber 50 which does not support the fragmentation method is connected, is assigned the information that fragmented transmission is not permitted via the fourth input/output interface 204. In contrast, the first to third input/output interfaces 201, 202, 203, to which standard subscribers are not directly connected, are assigned the information that fragmented transmission is permitted via the input/output interface in each case.

If the second distribution node 2 detects that the addressed subscriber 6 is a standard subscriber 50, as in the second scenario, which does not support the fragmentation procedure, it is possible that the second distribution node 2, before starting a transmission of a telegram 3 addressed to the standard subscriber 50, always first receives the telegram 3 entirely. The switching unit 205 in the second distribution node 2 then evaluates the telegram 3 after complete receipt to determine whether it is a telegram fragment 301, 302, i.e. whether fragmenting information is included that identifies the received telegram data as the first telegram fragment 301 of a telegram 3.

In the second scenario, the switching unit 205 of the second distribution node 2 recognizes in the first telegram fragment 301 of the first telegram 3 the first fragment control symbol and the fragment number contained in the preceding fragment information indicating that it is a first telegram fragment 301. The second distribution node 2 then stores the received first telegram fragment 301 and the further subsequently received second and further telegram fragments 302 in the memory unit 207 until the switching unit 205 in the second distribution node 2 recognizes on the basis of the fragmenting information and the end of frame control symbol 36 contained in a subsequent telegram fragment, in the second scenario in the second telegram fragment 302 of the first telegram 3, that no further telegram fragments are being transmitted and thus the telegram 3 has been received completely.

The switching unit 205 in the distribution node 2 then reassembles the telegram fragments 301, 302 stored in the memory unit 207 into the overall telegram based on the fragmentation information in the telegram fragments 301, 302. In the second scenario, the switching unit 205 in the second distribution node 2 thus reassembles the two telegram fragments 301, 302 into the first telegram 3 based on the fragmenting numbers.

Furthermore, the switching unit 205 in the second distribution node 2 additionally checks on the basis of the checksum transmitted along in the individual telegram fragments 301, 302 whether the respective telegram fragment 301, 302 was transmitted correctly. It may also be provided that the switching unit 205 in the second first distribution node 2 checks the telegram 3 for completeness after the telegram 3 has been assembled on the basis of the original checksum of the telegram 3, which may be transmitted in the trailer 35 of the last telegram fragment 302. However, it is also possible that the verification of the telegram 3 is first performed by the addressed subscriber 6, in the second scenario by the standard subscriber 50, to which the complete telegram 3 is then forwarded by the distribution node.

The transmission of the assembled first telegram 3 in the second distribution node 2 to the standard subscriber 50 is carried out via the fourth input/output interface 204 if the fourth input/output interface 204 is free. However, the distribution node 2 may again prioritize with respect to the assembled first telegram 3. If the assembled telegram 3 has a higher priority than the telegram 3 currently being sent on the fourth input/output interface 204, this telegram 3 may be interrupted in order to only then send the assembled first telegram 3. Conversely, it is also possible to interrupt the transmission of the assembled first telegram 3 if a telegram 3 with a higher priority is received that is to be forwarded on the same fourth input/output interface 204.

In principle, however, the second distribution node 2 is embodied in such a way that, if the subscriber identifier indicates, as in the case of the assembled first telegram 3, that the addressed standard subscriber 50 does not support the fragmentation procedure, the second distribution node 2 does not fragment telegrams 3 to be sent to this standard subscriber 50.

If, for example, a further telegram 3 with the priority value two is received by the third fragmenting subscriber 30 during the transmission process of the assembled first telegram 3 with the priority value one via the second input/output interface 202 from the second distribution node 2, which is addressed to the standard subscriber 50, the switching unit 205 of the second distribution node 2 aborts the transmission process of the assembled first telegram 3 and transmits the further telegram 3 received by the third fragmenting subscriber 30 to the standard subscriber 50 instead. After the end of the transmission process of the further telegram 3, the transmission process of the assembled first telegram 3 is then restarted. Alternatively, it is also possible for the second distribution node 2 to be embodied in such a way that, if the telegram 3 is addressed to a subscriber 6 such as the standard subscriber 50, which does not support the fragmentation method, the second distribution node 2 does not interrupt a transmission process in principle and always first completely transmits the telegram 3, irrespective of whether the further telegram 3 received has a higher priority value.

As an alternative to the procedure of the switching unit 205 in the second distribution node 2 to always first completely receive the telegrams 3 addressed to a standard subscriber 50 before the telegrams 3 are forwarded further, the switching unit 205 of the second distribution node 2 may also be embodied in such a way that even if the addressed subscriber 6 does not support the fragmentation procedure, telegrams 3 are basically already forwarded according to the transmission rules stored in the allocation table 206 even before the complete telegram is received. If the switching unit 205 of the second distribution node 2 then determines in parallel with the transmission process during evaluation of the telegram 3 that said telegram 3 is fragmented, the switching unit 205 of the second distribution node 2 aborts the transmission process and stores the entire received telegram fragment in the memory unit 207 in order to wait for receipt of the further telegram fragments. The addressed standard subscriber 50 then discards the data already transmitted, as there is no checksum or an incorrect checksum.

It may generally be provided in the automation network that all distribution nodes 1, 2 are embodied in accordance with the second distribution node 2 described above, i.e. the switching unit 205 in the distribution node 1, 2 always checks whether a subscriber 6 in a network segment to which a telegram 3 is to be sent supports the fragmentation procedure used in the automation network, and then assembles an Ethernet telegram 3, which is fragmented, to be sent to a standard subscriber that does not support the fragmentation procedure. However, it is also possible to use distribution nodes 1, 2 in the automation network as part of the fragmentation procedure that do not support this procedure. In this case, the automation network must be embodied in such a way that only fragmenting nodes 10, 20, 30, 40 can be connected to these distribution nodes 1, 2, i.e. nodes that can assemble the telegram fragments themselves.

The automation network can be configured by the master subscriber if the field-bus system operates according to the master-slave principle. The master subscriber may then also be embodied in such a way that, when the automation network is started up, the master subscriber uses telegrams 3 to transmit the allocation tables 206 to the distribution nodes 1, 2, information being recorded in said allocation tables 206 on whether or not a subscriber connected to an input/output interface 101, 102, 103, 201, 202, 203, 204 supports the fragmentation procedure in the automation network. Also, it is possible that if e.g. subscribers 6 are added or removed in the network segment as part of a plug-in technique, the master subscriber informs the distribution nodes 1, 2 of this change, in particular of the capability of determining whether or not the new subscriber 6 supports the fragmentation procedure.

As an alternative to determining the fragmentation capability of the subscribers 6 in the automation network by the master subscriber within the framework of a master-slave structure, the distribution node 2 itself may also determine, e.g. via a point-to-point query, whether a subscriber 6 connected to a first to fourth input/output interface 201, 202, 203, 204 of the distribution node 2 supports the fragmentation procedure or not. This may be done during the start-up of the automation network or during operation when the distribution node 2 detects that a change of subscriber has occurred in a network segment connected to a first to fourth input/output interface 201, 202, 203, 204. The distribution node 2 may detect a change in a network segment e.g. via the assigned first to fourth input/output interfaces 201, 202, 203, 204, if the data traffic on the network segment is interrupted by a subscriber change.

Furthermore, it is also possible that a programming device is provided at the distribution node 2, via which it can be determined in the allocation table 206 in the distribution node 2 whether a subscriber 6 connected to a first to fourth input/output interface 201, 202, 203, 204 supports the fragmentation method in the automation network or not.

The present invention was described in detail by preferred embodiment examples. However, it is not limited by the disclosed examples since a person skilled in the art may derive variations therefrom without exceeding the protective scope of the invention.

The advantageous embodiments and further embodiments of the present invention that have been described above and/or defined in the dependent claims may be put to use individually or in any desired combination with one another—except for in case of unambiguous dependencies and incompatible alternatives.

The invention claimed is:

1. A distribution node for an automation network having a plurality of network segments which each have at least one subscriber configured as a fragmenting subscriber or as a standard subscriber, wherein data are exchanged between the subscribers in the form of telegrams, wherein the transmission of the telegrams is carried out in accordance with a fragmentation method in the form of telegram fragments and wherein both fragmenting subscribers which support the fragmentation method and standard subscribers which do not support the fragmentation method are provided for in the automation network, wherein the distribution node comprises a plurality of input/output interfaces and a switching unit connected to the input/output interfaces, the switching unit being configured to control an operation of the distribution node, wherein at least one input/output interface is in communication with a network segment, wherein the switching unit is configured to check whether a subscriber at the input/output interface to which a telegram is to be sent supports the fragmentation method and whether the telegram to be sent is fragmented, and wherein the switching unit is configured, if the telegram to be sent is fragmented, to assemble the telegram fragments into the telegram and then to send the telegram to the subscriber if the subscriber is a standard subscriber that does not support the fragmentation method.

2. The distribution node according to claim 1, further comprising:

an allocation table which contains identifiers of the standard subscribers which do not support the fragmentation method, wherein the switching unit is configured to detect an identifier of the addressed subscriber upon receipt of a telegram and to compare the telegram with the identifiers of the standard subscribers in the allocation table, the switching unit being further configured, if the telegram to be sent is fragmented, to assemble the telegram fragments into the telegram if the compare of the telegram with the identifiers of the standard subscribers in the allocation table identifies a standard subscriber that does not support the fragmentation method.

3. The distribution node according to claim 1, further comprising:

an allocation table in which the input/output interface with the network segment is allocated information whether fragmented transmission is allowed via the input/output interface or not, and wherein the switching unit is configured, if the telegram to be sent is fragmented, to assemble the telegram fragments into the telegram if the allocation table indicates that the input/output interface to which the telegram is to be sent does not support the fragmentation method.

4. The distribution node according to claim 2, wherein the switching unit is configured to create the allocation table at start-up of the automation network.

5. The distribution node according to claim 2, wherein the switching unit is configured to autonomously perform a checking process with the subscribers in network segments connected to the input/output interfaces in order to determine the identifiers of the standard subscribers that do not support the fragmentation process.

6. The distribution node according to claim 1, wherein the distribution node is configured to always first fully receive telegrams intended for a standard subscriber that does not support the fragmentation method before starting transmission to the standard subscriber.

7. The distribution node according to claim 1, wherein:
the switching unit is configured to abort a transmission process if the telegram is fragmented, and
if the telegram is intended for a standard subscriber that does not support the fragmentation process, the standard subscriber discards the already transmitted telegram fragment.

8. The distribution node according to claim 1, wherein the switching unit is configured, when a telegram is to be sent to a standard subscriber in a network segment connected to an input/output interface that does not support the fragmentation method, not to apply the fragmentation method to the telegram.

9. An automation network comprising:
network segments which each have at least one subscriber configured as a fragmenting subscriber or as a standard subscriber, and
at least one distribution node which has a plurality of input/output interfaces and a switching unit which is connected to the input/output interfaces, at least one input/output interface being connected to a network segment, the switching unit being configured to control an operation of said at least one distribution node;
wherein data are exchanged between the subscribers in the form of telegrams configured to be transmitted in accordance with a fragmentation method in the form of telegram fragments, wherein both fragmenting subscribers which support the fragmentation method and the standard subscribers which do not support the fragmentation method are provided for,
wherein the switching unit in the distribution node is configured to check whether a subscriber at the input/output interface to which a telegram is to be transmitted supports the fragmentation method, and whether the telegram to be sent is fragmented, and
wherein the switching unit in the distribution node is configured, if the telegram to be sent is fragmented, to assemble the telegram fragments into the telegram and then to send the telegram to a standard subscriber that does not support the fragmentation method.

10. The automation network according to claim 9, wherein:
the at least one distribution node comprises an allocation table comprising identifiers of the standard subscribers that do not support the fragmentation method, and wherein the switching unit in the distribution node is configured to detect an identifier of the addressed subscriber upon receipt of a telegram and to compare the telegram with the identifiers of the standard subscribers in the allocation table.

11. The automation network according to claim 9, further comprising:
an allocation table in which the input/output interface with the network segment is allocated information whether fragmented transmission is allowed via the input/output interface or not, and
wherein the switching unit is configured, if the telegram to be sent is fragmented, to assemble the telegram fragments into the telegram if the allocation table indicates that the input/output interface to which the telegram is to be sent does not support the fragmentation method.

12. The automation network according to claim 10, wherein the switching unit in the distribution node is configured to create the allocation table at start-up of the automation network.

13. The automation network according to claim 10, wherein:
one subscriber acts as a master subscriber that monitors the further subscribers in the automation network and informs the at least one distribution node which subscribers in the automation network that are connected to an input/output interface via a network segment do not support the fragmentation method, and
wherein the switching unit in the distribution node is configured to update the allocation table according to information received from the master subscriber.

14. The automation network according to claim 10, wherein the switching unit in the distribution node is configured to autonomously perform a verification operation with the subscribers in network segments connected to the input/output interfaces to determine the identifiers of the standard subscribers that do not support the fragmentation procedure.

15. The automation network according to claim 9, wherein the distribution node is configured to always first fully receive telegrams intended for a standard subscriber that does not support the fragmentation method before starting transmission to the standard subscriber.

16. The automation network according to claim 9, wherein the distribution node is configured to abort a transmission process if the telegram is fragmented and if the telegram is intended for a standard subscriber that does not support the fragmentation process, wherein the standard subscriber discards the already transmitted telegram fragment.

17. The automation network according to claim 9, wherein the switching unit in the distribution node is configured, when a telegram is to be sent to a standard subscriber in a network segment connected to an input/output interface that does not support the fragmentation method, not to apply the fragmentation method to the telegram.

18. A method for transmitting telegrams in an automation network comprising network segments which each have at least one subscriber configured as a fragmenting subscriber or as a standard subscriber, and having at least one distribution node which has a plurality of input/output interfaces and a switching unit which is connected to the input/output interfaces, wherein:

at least one input/output interface is connected to a network segment, wherein the switching unit is configured to control an operation of said at least one distribution node, wherein data is exchanged between the subscribers in the form of telegrams, wherein the transmission of the telegrams is carried out according to a fragmentation method in the form of telegram fragments and wherein both fragmenting subscribers that support the fragmentation method and standard subscribers that do not support the fragmentation method are provided for, and wherein the switching unit in the distribution node checks whether a subscriber having an input/output interface to which a telegram is to be sent supports the fragmentation method, and whether the telegram to be sent is fragmented, and if the telegram to be sent is fragmented, assembles the telegram fragments to form the telegram and then sends the telegram to a standard subscriber which does not support the fragmentation method.

19. The method according to claim 18, wherein:

the at least one distribution node comprises an allocation table containing identifiers of the standard subscribers that do not support the fragmentation method, and wherein the switching unit in the distribution node detects an identifier of the addressed subscriber upon receipt of a telegram and compares the telegram with the identifiers of the standard subscribers in the allocation table.

20. The method according to claim 18, wherein:

an allocation table allocates to the input/output interface with the network segment information whether fragmented transmission is allowed over the input/output interface or not, and wherein the switching unit is configured, if the telegram to be sent is fragmented, to assemble the telegram fragments into the telegram if the allocation table indicates that the input/output interface to which the telegram is to be sent does not support the fragmentation method.

* * * * *